US012269638B2

(12) United States Patent
Canady

(10) Patent No.: US 12,269,638 B2
(45) Date of Patent: Apr. 8, 2025

(54) LABELER SETUP KIT

(71) Applicant: Anheuser-Busch, LLC, St. Louis, MO (US)

(72) Inventor: Andy Jason Canady, Jacksonville, FL (US)

(73) Assignee: Anheuser-Busch, LLC, St. Louis, MO (US)

( * ) Notice: Subject to any disclaimer, the term of this patent is extended or adjusted under 35 U.S.C. 154(b) by 145 days.

(21) Appl. No.: 18/006,538

(22) PCT Filed: Jul. 22, 2021

(86) PCT No.: PCT/US2021/042683
§ 371 (c)(1),
(2) Date: Jan. 23, 2023

(87) PCT Pub. No.: WO2022/020541
PCT Pub. Date: Jan. 27, 2022

(65) Prior Publication Data
US 2023/0257153 A1 Aug. 17, 2023

Related U.S. Application Data

(60) Provisional application No. 63/055,705, filed on Jul. 23, 2020.

(51) Int. Cl.
*B65C 3/16* (2006.01)
*B65C 3/18* (2006.01)

(52) U.S. Cl.
CPC . *B65C 3/16* (2013.01); *B65C 3/18* (2013.01)

(58) Field of Classification Search
CPC .... B65C 3/14; B65C 3/16; B65C 3/18; B65C 9/40; B29C 65/7879; B29C 65/7882; B29C 65/7885

(Continued)

(56) References Cited

U.S. PATENT DOCUMENTS 4,857,134 A * 8/1989 Lin ........................ B65B 51/067 156/577
5,201,984 A * 4/1993 Bedin ...................... B65C 9/065 156/DIG. 27

(Continued)

FOREIGN PATENT DOCUMENTS

CN 210140041 U 3/2020
EP 0497081 A2 8/1992

(Continued)

OTHER PUBLICATIONS

International Search Report and Written Opinion received for PCT Application No. PCT/US2021/042683, mailed on Nov. 5, 2021, 8 pages.

(Continued)

*Primary Examiner* — Philip C Tucker
*Assistant Examiner* — Brian R Slawski
(74) *Attorney, Agent, or Firm* — Husch Blackwell LLP

(57) ABSTRACT

The present invention provides a kit used to align a spender plate that provides labels to bottle neck and/or body using the center line transfer method and/or leading edge method and the application rollers and pads that "wipe" the label to fully adhere it to the bottle's neck. The kit may include a scribed bottle, an adjustment tool, and alignment bar. These components may assist a technician in consistently and repeatedly aligning the spender plate and/or the application rollers and pads.

14 Claims, 5 Drawing Sheets

(58) Field of Classification Search
USPC ......... 156/60, 277, 297, 332, 349, 384, 443, 156/458, 475, 486, 538, 539, 556, 566, 156/567; 101/40; 215/386
See application file for complete search history.

(56) References Cited

U.S. PATENT DOCUMENTS

| | | | | |
|---|---|---|---|---|
| 5,415,268 | A | 5/1995 | Lofgren | |
| 2007/0042684 | A1 * | 2/2007 | Park | B24C 1/06 451/29 |
| 2008/0272916 | A1 * | 11/2008 | Breysse | G06K 19/07381 215/386 |
| 2016/0253929 | A1 * | 9/2016 | Quintin | B44C 3/025 206/459.5 |

FOREIGN PATENT DOCUMENTS

| | | | |
|---|---|---|---|
| JP | 08-133251 | A | 5/1996 |
| JP | H08-133251 | A | 5/1996 |

OTHER PUBLICATIONS

International Preliminary Report on Patentability received for PCT Application No. PCT/US2021/042683, mailed on Feb. 2, 2023, 7 pages.

* cited by examiner

LABELER SETUP KIT

CROSS-REFERENCE TO RELATED APPLICATIONS

This Application claims priority to U.S. Provisional Patent Application Ser. No. 63/055,705, filed on Jul. 23, 2020, entitled "LABELER SETUP KIT," the entire disclosure of which is incorporated herein by reference.

FIELD OF THE INVENTION

The invention refers to bottle labeling. More specifically, this invention refers to a kit that may be used to calibrate a bottle labeling system so that spender plates that apply pressure sensitive labels may be simply and repeatably positioned.

BACKGROUND OF THE INVENTION

Alcoholic and non-alcoholic beverages alike are often bottled in "longneck-style" bottles. Those bottles are typically labeled at their bottle necks to indicate the brand of beverage, the beverage's ingredients, the beverage's nutrition information, etc. Such labels are often applied as "pressure sensitive labels" that already include adhesive.

Pressure sensitive labels stick to bottles when enough pressure is applied. The degree of bonding between the bottle and the label is influenced by the amount of pressure used to apply the adhesive to the bottle's surface. The pressure sensitive label is typically applied using a labeling machine that includes a spender plate that places the label at least partially around a bottle neck's circumference.

Unfortunately, with frequent use, various components of the labeling machine often become misaligned. The various components may include the spender plate, an aggregate (and various bottle servos positioned thereon), and the rollers and pads that apply the labels. Realigning the components of the labeler system is a painstaking process that requires lots of trial and error. A simple, repeatable solution is desired.

SUMMARY OF THE INVENTION

The present invention provides a tool kit that properly sets precise positions for the labeler's mechanical components. Specifically, the kit sets positions for: (1) an edge of a spender plate that applies a label to a bottle's neck and body surface; and (2) associated application rollers and application pads of the labeling machine. To assist the user in adjusting alignment of the labeler's components, the kit may include a scribed bottle, an alignment tool, an alignment bar, and J-hook members.

During alignment, the scribed bottle may be placed on a servo bottle plate of the labeler machine. The scribed bottle may be substantially the same size and shape as bottles typically used with the labeler. The scribed bottle and an alignment tool may be used together to properly align the spender plate. The alignment tool may be affixed to the outside perimeter of the labeling machine such that an extension rod of the alignment tool protrudes towards the labeling machine. The extension rod may be received within a cavity of the scribed bottle to help properly align both the adjustment tool and the scribed bottle. After the alignment of the scribed bottle is complete, the technician may then remove the alignment tool. Finally, the technician may align the edge of the spender plate with an indicator mark on an upper portion of the scribed bottle. After the edge of the spender plate edge is aligned with the indicator mark, the spender plate is preferably properly aligned.

Once the spender plate is aligned, the technician may use the alignment bar to properly align the application rollers and pads that adhere a label to an upper portion of a bottle. The alignment bar may include predetermined marks that are visible when the technician attaches the alignment bar to the labeling machine. During the adjustment process, the technician may align the rollers of the labeling machine with the predetermined marks on the alignment bar to put the rollers in the proper alignment.

Using the kit, the alignment processes for the spender plate and the rollers may be repeated as many times as desired by the technician until all of the components of the labeling machine are in the proper alignment.

BRIEF DESCRIPTION OF THE DRAWINGS

For a better understanding of the various embodiments of the present invention, reference may be made to the accompanying drawings in which.

Figure 1:
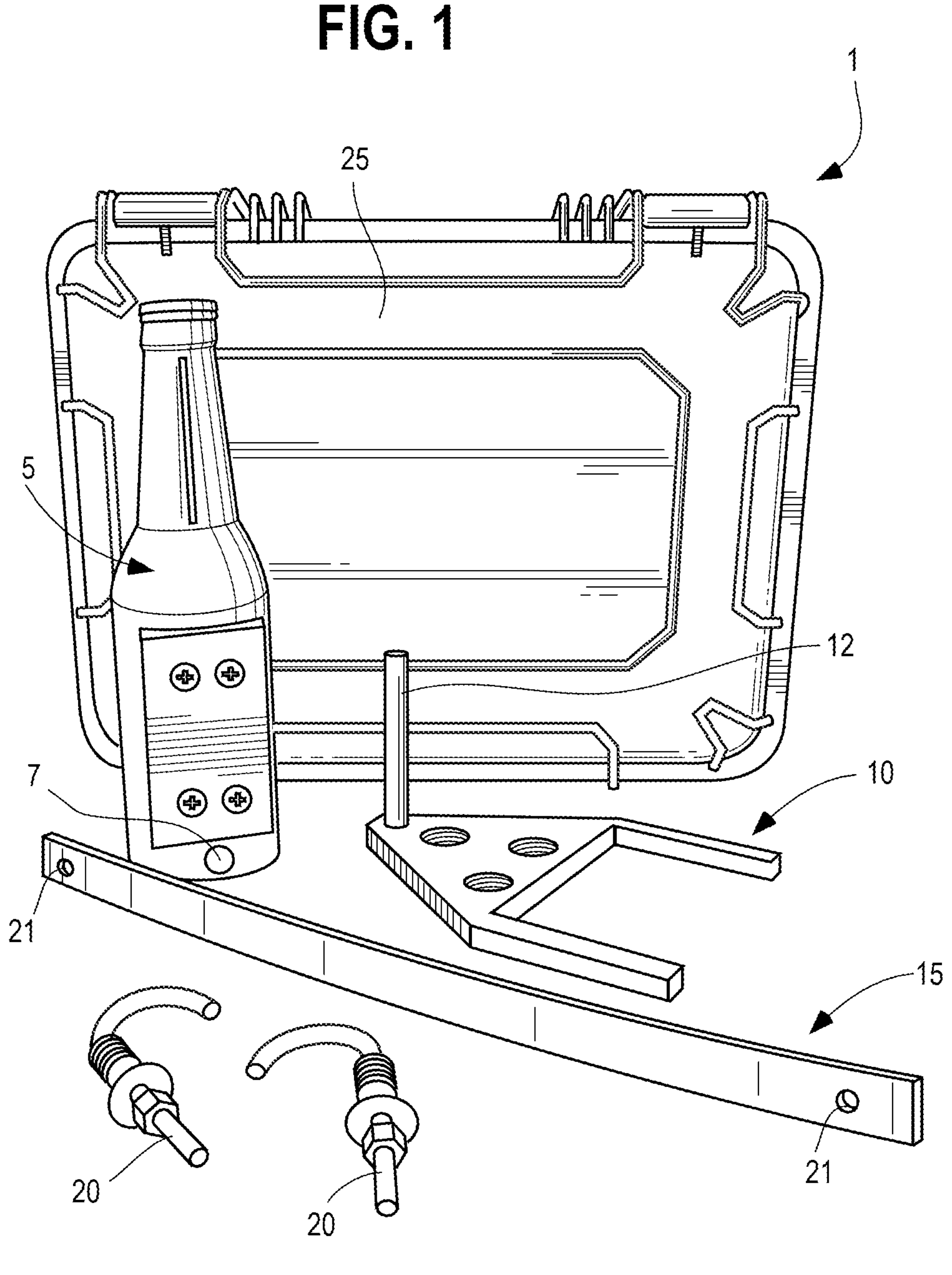
FIG. 1 illustrates a labeler setup kit constructed according to the teachings of the present invention.

While the disclosure is susceptible to various modifications and alternative forms, specific embodiments thereof are shown by way of example in the drawing and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be understood that any dimensions included in the figures are simply provided as examples and dimensions other than those provided therein are also within the scope of the invention.

The description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Turning first to FIG. 1, a labeler setup kit 1 (hereinafter referred to as the "kit 1") is illustrated. The kit 1 generally includes a scribed bottle 5 that may further include a cavity 7, an alignment tool 10 that may further include an extension rod 12, an alignment bar 15, and J-hook members 20. The scribed bottle 5 and the alignment tool 10 may be used to adjust the alignment of spender plates of a labeler. In comparison, the alignment bar 15 and the J-hook members 20 (when the J-hook members 20 are received into apertures 21 of the alignment bar 15) may be used to adjust the position of application rollers and pads of the labeler. The kit 1 may also include a case member 25 in which the above-described components may be stored until ready for use.

The scribed bottle 5 may be substantially the same size as the bottles used with the labeler during normal operations. Similarly, the alignment tool 10, the alignment bar 15, and the J-hook members 20 may be appropriately sized to interface with and appropriately align various components of the labeler. Thus, in alternative embodiments of the invention, the size of the components of the kit 1 may be altered such that the components may properly adjust other labeling machines. Further, in yet other embodiments of the invention, the position of the apertures 21 and the number of the apertures 21 may be different to accommodate yet other labelers.

Figure 2:
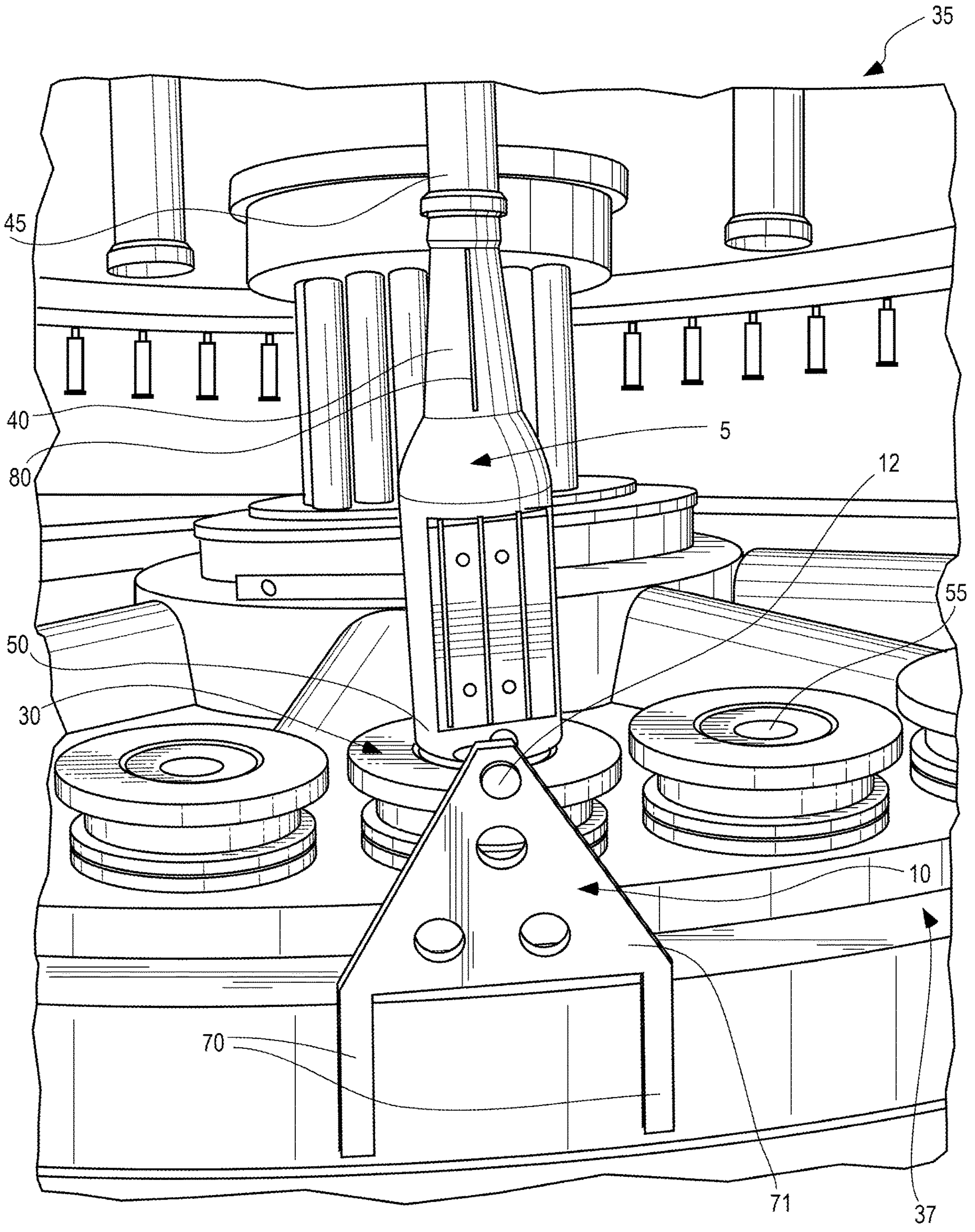
FIG. 2 illustrates an alignment tool and a scribed bottle of the kit of FIG. 1, the scribed bottle placed on a bottle table where an associated spender plate would be positioned during standard operation of the labeler.
Figure 3:
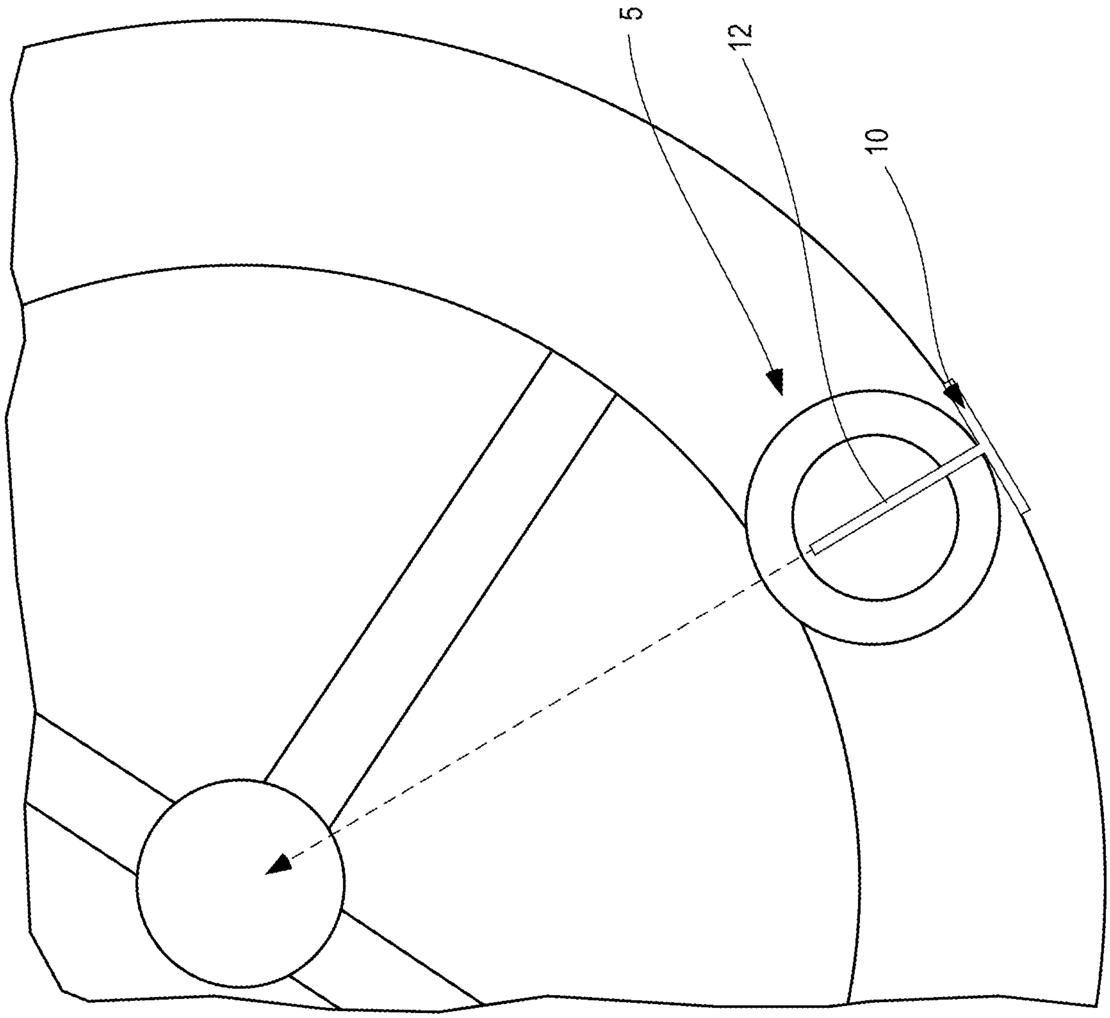
FIG. 3 illustrates a schematic of the required alignment and a location where the scribed bottle of the kit of FIGS. 1 and 2 are placed on the bottle table.

Turning now to FIGS. 2 and 3, when using the kit 1, the scribed bottle 5 may be placed on a servo bottle plate 30 associated with a labeler 35. The servo bottle plate 30 is positioned upon a table 37 of the labeler 35. The scribed bottle 5 may be placed such that an upper portion 40 of the scribed bottle 5 is received within a bell 45 configured to receive the upper portion 40. During standard operation of the labeler 35, the bell 45 receives and secures an upper portion of a bottle to be labeled. A lower portion 50 of the scribed bottle 5 may be placed on a servo bottle plate 30 such that the lower portion 50 is received and secured within a cavity 55 on the servo bottle plate 30.

Next, the alignment tool 10 may be placed such that the extension rod 12 (best seen in FIG. 3) of the alignment tool 10 projects towards the scribed bottle 5 and is received within a cavity 7 (illustrated in FIG. 1) of the scribed bottle 5. The cavity 7 may be positioned within the lower portion 50 of the scribed bottle 5, although other positions for the cavity 7 are foreseeable. After initial placement of the alignment tool 10, an operator may then rotate the scribed bottle 5 (by rotating the servo bottle plate 30 or by rotating the scribed bottle 5 itself) while applying rotational pressure to the alignment tool 10. The operator may continue apply force in the rotational direction until two post members 70 (which protrude downwardly from a body 71 of the alignment tool 10) contact the table 37 upon which the servo bottle plates 30 are affixed. The post members 70 may be substantially perpendicular to the extension rod 12. In alternative embodiments of the invention, the alignment tool 10 may have one or more post members 71 as would be appreciated by those skilled in the art. Once the post members 70 contact the table 37, the scribed bottle 5 is preferably positioned such that it may be used to align the spender plate of the labeler 35. Thus, the alignment tool 10 may be removed from the table 37. When the scribed bottle 5 is in this position, an indicator mark 80 (embodied here as a vertical line, although other embodiments are foreseeable) is substantially centered on the upper portion 40 of the bottle 5.

Figure 4:
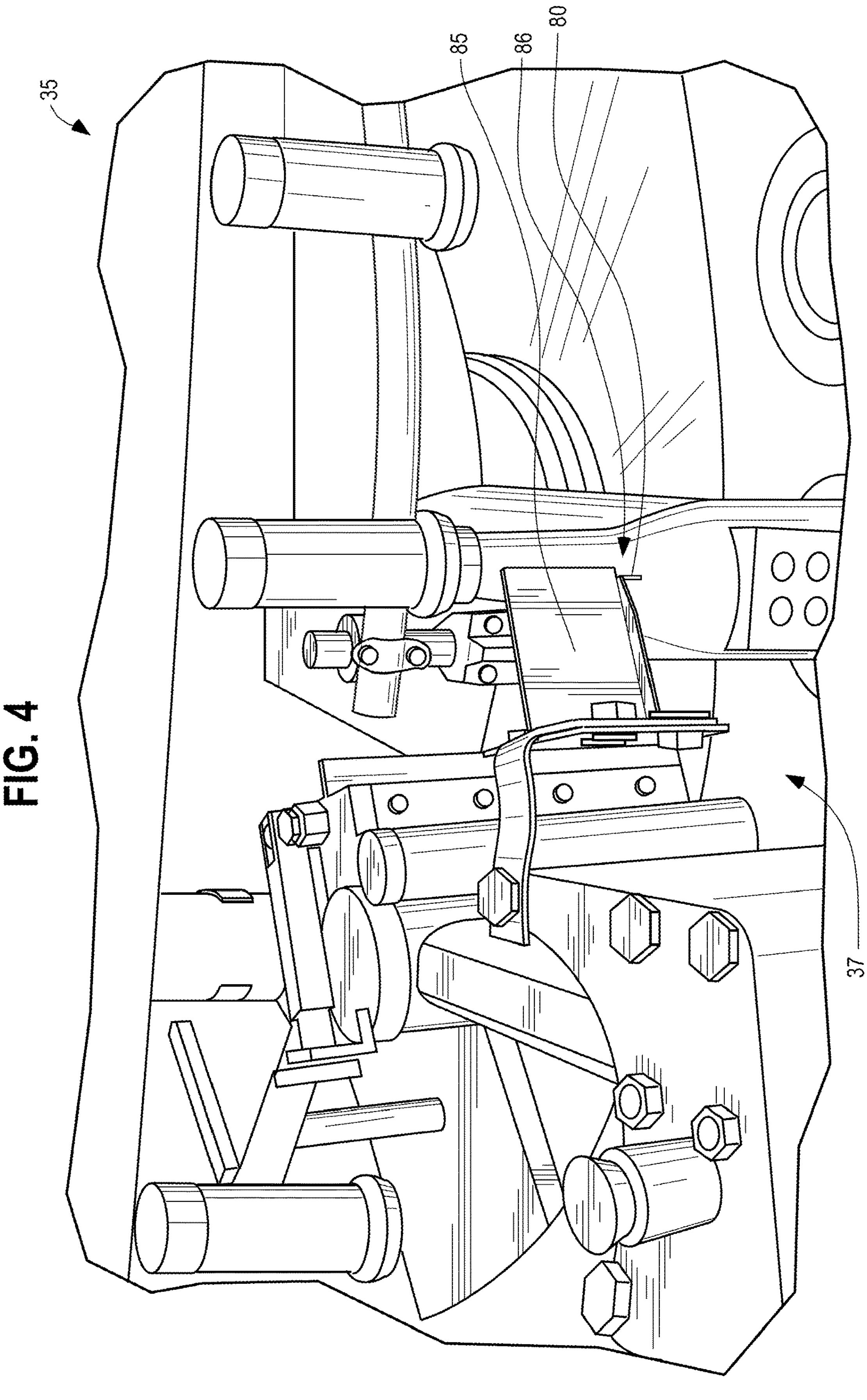
FIG. 4 illustrates a spender plate edge being aligned to the scribed bottle.

Without removing the scribed bottle 5, the operator may now place an aggregate (not illustrated) and the servo bottle plate 30 associated with the aggregate in their standard operating position. Then, the operator may substantially align a spender plate 85 with the indicator mark 80, as illustrated in FIG. 4. To align the spender plate 85, an operator may use known and understood techniques to adjust the pitch, yaw, and roll of an edge 86 of the spender plate 85 until the edge 86 is in substantial alignment with the indicator mark 80. An operator may continue the foregoing process to adjust other spender plates (not illustrated) disposed of around the circumference of the table 37. Once each of the spender plates 85 have been sufficiently adjusted, the operator may lock the spender plates 85 in place prior to beginning operation of the labeler 35.

Figure 5:
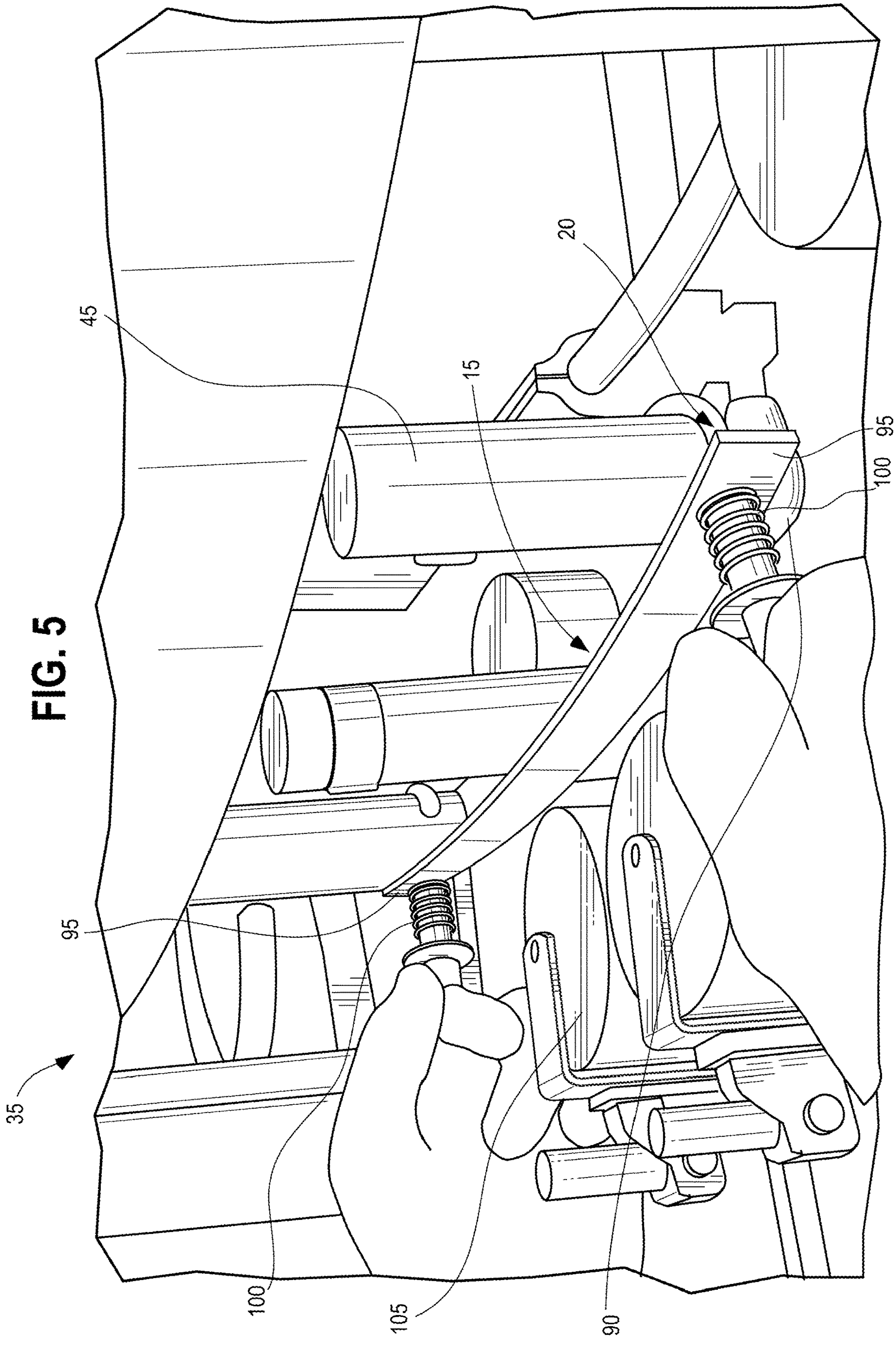
FIG. 5 illustrates application rollers being aligned to an alignment bar of the kit of FIG. 1.

In addition to adjusting the position of the spender plate, the kit 1 may be used to adjust the position of application rollers and pads that are used to adhere a label to an upper portion of a bottle (not illustrated) after the label has been initially applied thereto. More particularly, as illustrated in FIG. 5, the alignment bar 15 and the J-hook members 20 may be attached to the bells 45 such that the alignment bar 15 rests on a flared portion 90 of the bell 45 and the J-hook members 20 are affixed to the bells 45. Further, the J-hook members 20 may be received into the apertures 21 (not illustrated) of the alignment bar 15. The apertures 21 may be positioned on opposite ends 95 of the alignment bar 15 such that the J-hook members 20 may engage the bells 45 while the J-hook members 20 are received within the apertures 21. The J-hook members 20 may be spring-loaded such that once the alignment bar 15 is positioned, springs 100 of the J-hook members 20 may apply a force to the alignment bar 15 to retain the alignment bar 15 in place and on the bells 45. Once the alignment bar 15 is positioned such that it is adjacent to at least two bells 45, rollers 105 may be adjusted to align with predetermined marks (not illustrated) located on the alignment bar 15. The predetermined marks on the alignment bar 15 are intentionally positioned to align the rollers 105 (and any associated pads) in a proper position.

This alignment process may be repeated around the circumference of the labeler 35 so that each of the rollers 105 are properly positioned relative to the bells 45. Once the alignment process is complete, the labeler 35 may not only apply labels to the upper portion of a bottle but may also, with the rollers 105, "wipe down" the label after it has been applied to a bottle's center using a centerline transfer method.

Depending on the needs of the technician, the kit 1 may be used to carry out the spender plate adjustment process and the roller and pad adjustment process independently of each other. The technician may also carry out the alignment processes concurrently. The technician may use his or her judgment to determine which components of the labeler need alignment and choose the appropriate alignment processes as necessary.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A kit for aligning a labeler, the kit comprising:

a scribed bottle including an indicator mark on an upper portion thereof;

an alignment tool including one or more post members projecting downwardly from a body of the alignment tool;

an alignment bar including at least two apertures positioned on opposite ends of the alignment bar; and wherein the alignment tool and the scribed bottle align a spender plate of the labeler, and the alignment bar aligns rollers and pads of the labeler.

2. The kit of claim 1, wherein the alignment tool further includes an extension rod projecting outwardly from the body of the alignment tool, and the scribed bottle further includes a cavity on a lower portion of the scribed bottle.

3. The kit of claim 2, wherein when the extension rod is received within the cavity of the scribed bottle and the one or more post members contact a table associated with the labeler, the spender plate is aligned by arranging the spender plate along the indicator mark of the scribed bottle.

4. The kit of claim 2, wherein the one or more post members are positioned substantially perpendicular to the extension rod.

5. The kit of claim 1, wherein the alignment bar further includes one or more J-hook members that hold the alignment bar in position upon bells provided on the labeler during alignment of the rollers and pads.

6. The kit of claim 5, wherein the one or more J-hook members are received into the at least two apertures of the alignment bar.

7. A method for aligning components of a bottle labeler, the bottle labeler including a servo bottle plate, a table, bells, a spender plate, and rollers, the method comprising the steps of:

placing a scribed bottle on the servo bottle plate;

positioning an alignment tool such that an extension rod of the alignment tool is received in a cavity of the scribed bottle;

adjusting the servo bottle plate and the alignment tool such that two post members extending from the alignment tool abut the table on which the servo bottle plate is located;

adjusting a position of an edge of the spender plate such that it aligns with an indicator mark positioned on the scribed bottle;

placing an alignment bar having at least two apertures on flared portions of the bells;

affixing one or more J-hook members to the bells; and adjusting the rollers such that the rollers align with predetermined marks on the alignment bar.

8. The method of claim 7, wherein the method further includes the step of removing the alignment tool from the table after the post members are arranged to abut the table.

9. The method of claim 7, wherein springs of the one or more J-hook members hold the alignment bar in position after the one or more J-hook members are affixed to the bells.

10. The method of claim 7, wherein the method further includes the step of inserting the one or more J-hook members through the at least two apertures of the alignment bar.

11. A method for aligning a spender plate of a bottle labeler, the bottle labeler including a servo bottle plate and a table, the method comprising the steps of:

placing a scribed bottle in a cavity of the servo bottle plate;

placing an alignment tool such that an extension rod of the alignment tool is received in a cavity of the scribed bottle;

rotating the scribed bottle and applying pressure to the alignment tool until two post members of the alignment tool abut the table on which the servo bottle plate is located; and adjusting a position of the spender plate such that it aligns with an indicator mark positioned on the scribed bottle.

12. The method of claim 10, wherein the alignment tool is removed after the post members are arranged to abut the table.

13. A method for aligning rollers and pads of a bottle labeler, the labeler including bells having flared portions, the method comprising the steps of:

providing an alignment bar having at least two apertures;

providing one or more J-hook members that can be selectively received into the at least two apertures of the alignment bar;

placing the alignment bar on the flared portions of the bells;

affixing the one or more J-hook members to the bells; and adjusting rollers of the labeler such that the rollers align with predetermined marks on the alignment bar.

14. The method of claim 13, wherein the method further includes the step of inserting the one or more J-hook members through the at least two apertures of the alignment bar.

* * * * *